United States Patent [19]

Steber

[11] 4,271,431
[45] Jun. 2, 1981

[54] SCAN CONVERTER UTILIZING DISCRETE DIFFERENTIALLY CODED SIGNALS

[75] Inventor: George R. Steber, Mequon, Wis.

[73] Assignee: Star Systems, Inc., Farmingdale, N.Y.

[21] Appl. No.: 950,465

[22] Filed: Oct. 11, 1978

[51] Int. Cl.³ .................. H04N 5/02; H04N 7/12; H04L 25/16

[52] U.S. Cl. .................. 358/140; 358/135; 375/27

[58] Field of Search ........... 358/12, 13, 133, 135, 358/136, 140, 141; 323/38 B; 375/27; 332/110

[56] References Cited

U.S. PATENT DOCUMENTS

| | | | |
|---|---|---|---|
| 3,017,456 | 1/1962 | Schreiber | 358/133 |
| 3,767,847 | 10/1973 | Haskell et al. | 358/135 |
| 3,769,451 | 10/1973 | Connor | 358/135 |
| 3,795,763 | 3/1974 | Golding et al. | 358/135 X |
| 4,051,530 | 9/1977 | Kuroda et al. | 358/136 |
| 4,057,836 | 11/1977 | Munsey | 358/140 |
| 4,077,053 | 2/1978 | Ishiguro | 358/136 |
| 4,125,861 | 11/1978 | Mounts et al. | 358/133 |
| 4,141,034 | 2/1979 | Netravali et al. | 358/13 |
| 4,148,070 | 4/1979 | Taylor | 358/140 X |

FOREIGN PATENT DOCUMENTS 2617884 3/1977 Fed. Rep. of Germany ........... 358/140

OTHER PUBLICATIONS

R. T. Grahm, "Predictive Quantizing of Television Signals", I.R.E. Wescon C. ond Record 2, Part 4 (1958), pp. 147–157.

Primary Examiner—Bernard Konick
Assistant Examiner—Aristotelis M. Psitos
Attorney, Agent, or Firm—Ostrolenk, Faber, Gerb & Soffen

[57] ABSTRACT

A scan rate converter utilizing a discrete differential coding system as disclosed. The scan rate converter converts input FSTV and SSTV video information into discrete differential coded signals and stores these signals in a high speed memory. The stored video information is read out of the high speed memory at both a fast scan and a slow scan rate and is reconverted into respective FFST and SSTV output signals.

14 Claims, 9 Drawing Figures

SCAN CONVERTER UTILIZING DISCRETE DIFFERENTIALLY CODED SIGNALS

BACKGROUND OF THE INVENTION

The present invention generally pertains to video information signal processing and is particularly directed to storage and retrieval of video information in a slow scan television system.

Slow scan techniques were developed to accommodate high data rate sources to narrow band communication channels. Slow scan techniques have had particular application to the transmission of video information, such as a picture developed as a television type raster scan frame, over voice grade communication channels at a data rate that can be accommodated in the limited bandwidth available. The time necessary to transmit sufficient information for a video presentation of acceptable quality requires on the order of 8 to 32 seconds per frame. Such slow frame rates are incompatible with conventional television monitors because the phosphors utilized on the face of the display tube do not have sufficient persistence to stay illuminated for a full frame.

One type of slow scan television system utilizes a specially designed slow scan display tube incorporating long persistence phosphors. In such a tube, the illumination produced by the electron beam produces an after glow of the long persistence phosphors that permits viewing of a complete frame in relatively low ambient light conditions. The face of the tube is the only storage for the received image and it is therefore necessary to have a continuously repeating image for longer display. On such tubes, the writing line, or bright portion of the tube, makes it difficult to view the remainder of the tube. Further, the 8 second delay in production of a new picture makes it difficult to adjust the system for proper contrast and other picture variables.

The disadvantages associated with the use of long persistence phosphors has led to the development of other slow scan television systems that incorporate storage for a complete frame of video information separate from the display tube. A slow scan image is written into a memory until a completed picture is developed. The completed image may then be retrieved from the memory as many times as is desired at a fast scan rate and displayed on a conventional television monitor. However, such systems are not capable of simultaneously monitoring the stored image and storing/retrieving slow scan information.

Various systems have been proposed incorporating a second memory unit so that fast scan monitoring and simultaneous slow scan read/write functions may be obtained. However, such systems are excessively expensive for many applications and increase the complexity of the system thereby degrading reliability and operational flexibility.

To overcome the foregoing problems, the prior art has proposed the use of a high speed digital memory for storing incoming video information at both a slow scan rate and a fast scan rate and for retrieving the stored video information at both the slow rate and the fast scan rate. In these prior art systems, the incoming video information is "quantized" both in space (two dimensions X and Y), and in gray shades. More particularly, each line of the incoming video signal is divided into a plurality (typically 128) of picture elements or pixels each of which represent the relative brightness of a different location on the respective horizontal line of video information. The total number of pixels in a single frame of the input video signal (the number of pixels per line times the number of lines in the frame) are stored in a digital memory, and cumulatively represent the entire video information of the single video frame. A scan converter utilizing the foregoing system is disclosed in an article by Steber, "SSTV to Fast Scan Converter", Parts I and II, QST, March 1975, pp. 33-40 and May 1975, pp. 28-46. A similar system is disclosed in U.S. Pat. No. 4,057,836. Another system utilizing an encoding technique is described in a second article by Steber, "SSTV Image Processing", QST, November 1976, pp. 13-16.

While the foregoing systems have produced generally satisfactory results, they are quite expensive. In order to perform the digital scan conversion, it is necessary to digitally encode the brightness of each pixel in the entire video frame. For good picture quality, it has been established that at least 64 brightness levels (six digital bits) per pixel are necessary since the eye is very sensitive to small brightness introduced by quantization. If less than six bits are used an objectionable phenomena called "contouring" becomes apparent to the viewer.

Since a typical horizontal slow scan line consists of 128 pixels and there are nominally 128 lines per frame, the stored video picture consists of 16,384 pixels. Since six digital bits are required per pixel, a total of 98,304 bits must be stored in the memory of the scan converter. If less bits per pixel could be used while still remaining the good picture quality, a substantial savings in the cost of the memory may be obtained.

SUMMARY OF THE INVENTION

To obtain the foregoing desirable reduction in the size of the memory of the scan converter, the present invention utilizes a discrete digital coding technique to reduce the number of bits in each pixel stored in the memory. As used herein, the term "discrete differential coded signal" refers to a digital signal which is representative of the difference between the actual video signal magnitude at a sampling instant t and a predicted signal magnitude for that sampling instant. By utilizing each successsive discrete digital signal to generate the next predicted video signal magnitude in such a manner that the difference between the predicted and actual video signals are reduced towards zero, it is possible to insure that the magnitude of each of the discrete digitally coded signals remains small. By so controlling the magnitude of the discrete differential coded signals, the number of pixels required for each respective discrete digital coded signal remains small and the required size of the memory is substantially decreased.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENT

Figure 1:
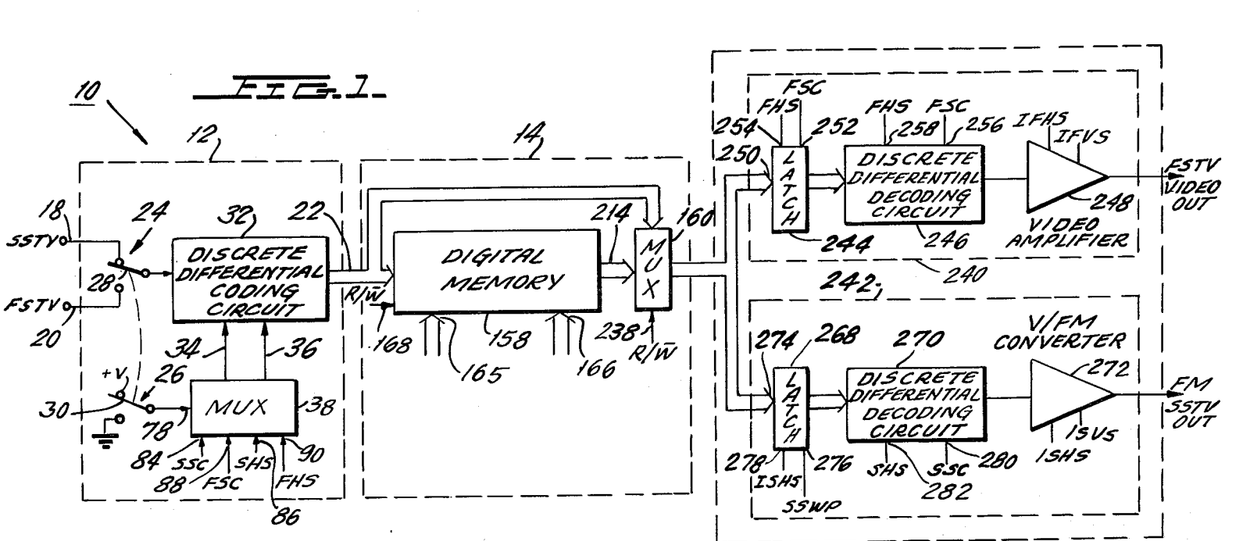
FIG. 1 is a block diagram of a scan converter constructed in accordance with the principles of the present invention.

Referring now to the drawings wherein like numerals indicate like elements, there is shown in FIG. 1 a scan converter constructed in accordance with the principles of the present invention and designated generally as 10. Scan converter 10 comprises an input section 12, a memory section 14 and an output section 16. Input section 12 receives either a slow scan television (hereinafter SSTV) signal on line 18 or a fast scan television (hereinafter FSTV) signal on line 20 and generates a discrete differential coded (hereinafter DDC) output signal on line 22 which is representative of either the input SSTV or the input FSTV signal. Input section 12 operates in two modes; an SSTV read in mode and an FSTV read in mode. In the SSTV read in mode, an SSTV signal appearing on line 18 is converted into a train of DDC signals each representative of a different pixel of the SSTV video information and is stored in the memory section 14. In the FSTV mode, an FSTV mode, an FSTV signal appearing on line 20 is converted into a train of DDC signals each representative of a different pixel of FSTV video information and stored in memory section 14.

When an SSTV signal is being stored by scan converter 10, switches 24, 26 are placed in their upper position wherein contact arms 28, 30 are coupled to line 18 and −V volts, respectively. In this condition, the discrete differential coding circuit 32 receives the input SSTV signal and samples the input signal at a rate determined by the clock and reset signals applied to its clock and reset inputs 34, 36, respectively. These signals are supplied by multiplexer 38 in a manner which will be described below. It is sufficient to state at this time that the clock and clear signals supplied by multiplexer 38 cause coding circuit 32 to sample the input SSTV signal at a relatively slow rate equal to m/n wherein said m represents the time interval of a single frame of the SSTV signal and n is the total number of pixels into which the television frame is to be separated (the number of pixels per line times the number of lines in a single frame). As a result, each succeeding DDC signal appearing on line 22 represents a different pixel of the incoming SSTV signal.

When an FSTV signal is received by scan converter 10, the contact arms 28, 30 of switches 24, 26 are switched to their lower position wherein contact arms 28, 30 are coupled to line 20 and ground, respectively. In this condition, the input FSTV signal is applied to discrete differential coding circuit 32 which samples the input signal at a relatively fast rate also determined by multiplexer 38. More particularly, multiplexer 38 will cause discrete differential coding circuit 32 to sample the input FSTV signal at a rate equal to m'/n, wherein m' represents the time it takes for a single frame of the FSTV signal to be transmitted and small n represents the total number of pixels into which the television frame is to be separated.

Figures 2, 3:
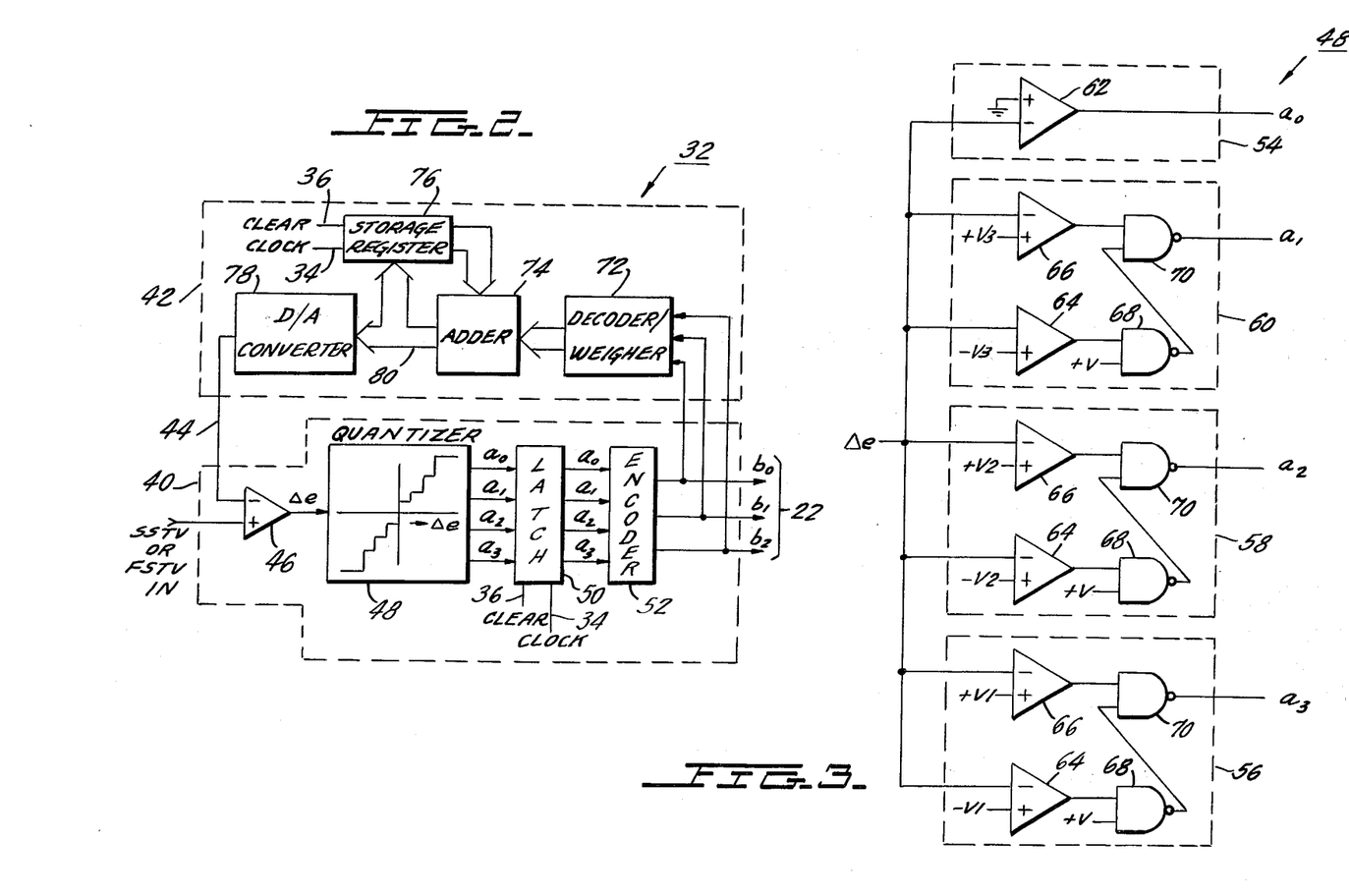
FIG. 2 is a block diagram of the discrete differential coding circuit of FIG. 1.
FIG. 3 is a circuit diagram of the digital quantizer of FIG. 2.

The preferred structure of discrete differential coding circuit 32 is illustrated in FIG. 2. As shown therein, coding circuit 32 includes an encoding section 40 and a feedback section 42. Encoding section 40 compares the magnitude of the incoming FSTV or SSTV signal with a predicted TV signal generated by feedback section 42 (and appearing on line 44) and generates a plurality of DDC output signals, each representative of the difference between each successive predicted and actual TV signal at each successive sampling instant.

Encoding section 40 includes a difference amplifier 46, a digital quantizer 48, a latch conduit 50, and an encoder 52. Difference amplifier 46 generates an analog output signal $\Delta e$ which is indicative of the instantaneous difference between the predicted and actual input TV signal applied to its inverting and non-inverting input terminals, respectively. As such, difference signal $\Delta e$ provides an indication of the error in the predicted TV signal generated at the last sampling instant. The difference signal $\Delta e$ is applied to digital quantizer 48 which classifies the error signal $\Delta e$ into one of a plurality of digital codes which are utilized by feedback section 42 to reduce the error in the next generated predicted TV signal towards zero. This is a desirable result since it will ensure that the magnitudes of the error signal $\Delta e$, and therefore the magnitude of the DDC signals generated by encoding section 40, remain at a relatively low value. Since the DDC signals generated by encoding circuit 40 remain at a relatively low value, they may be expressed digitally utilizing relatively few bits of data. By reducing the number of bits in each successively generated DDC signal, the size (and therefore the cost) of the memory which must store these bits is significantly reduced. In order to ensure this desired result, quantizer 48 classifies the error signal $\Delta e$ in a non-uniform, nonlinear manner which will cause feedback section 42 to make small corrections for small errors and much larger corrections for large errors.

One possible digital quantizer 48 is illustrated in FIG. 3. In this embodiment, quantizer 48 classifies the error signal $\Delta e$ into one of eight digital codes in accordance with the following table:

TABLE 1

| RANGE OF ERROR | | | CLASSIFIER CODE | | | | WEIGHTS |
|---|---|---|---|---|---|---|---|
| | | | $a_0$ | $a_1$ | $a_2$ | $a_3$ | |
| 0 | $<\Delta e$ | $<V1$ | 0 | 0 | 0 | 0 | 1/64 |
| V1 | $<\Delta e$ | $<V2$ | 0 | 0 | 0 | 1 | 3/64 |
| V2 | $<\Delta e$ | $<V3$ | 0 | 0 | 1 | 1 | 5/64 |
| V3 | $<\Delta e$ | | 0 | 1 | 1 | 1 | 11/64 |
| −V1 | $<\Delta e$ | $<0$ | 1 | 0 | 0 | 0 | −1/64 |
| −V2 | $<\Delta e$ | $<-V1$ | 1 | 0 | 0 | 1 | −3/64 |
| −V3 | $<\Delta e$ | $<-V2$ | 1 | 0 | 1 | 1 | −5/64 |
| | $\Delta e$ | $<-V3$ | 1 | 1 | 1 | 1 | −11/64 |

As shown in the foregoing table, quantizer 42 categorizes the error signal $\Delta e$ into four positive and four negative classifications. In the lower error ranges ($-V1<\Delta e<+V1$), the binary classifier code generated by quantizer 48 represents a relatively low weight increment of $\pm 1/64$, wherein $\pm 1$ represents the predicted change in the magnitude of the input video signal between the last sampling instant (corresponding to the last generated pixel) and the next succeeding sampling instant (corresponding to the next generated pixel), and 64 represents the total number of possible degrees of brightness for each pixel. In the highest error ranges ($V3 < \Delta e$, $\Delta e < -V3$), the binary classifier code generated by quantizer 48 represents a relatively high weight of $\pm 11/64$ indicating a predicted change of $\pm 11$ brightness levels of the video signal between the last and next succeeding sampling instants. It should be noted at this time that the foregoing table is exemplary only and that other weights, classifier codes and degrees of brightness may be utilized without departing from the spirit or scope of the present invention.

Referring again to FIG. 3, quantizer 48 includes first, second, third and fourth logic circuits 54–60. Logic circuit 54 comprises a comparator 62 whose non-inverting input terminal is grounded and whose inverting terminal receives the error signal $\Delta e$. So connected, comparator 62 generates a logical "0" whenever the error signal $\Delta e$ is positive and generates a logical "1" whenever error signal $\Delta e$ is negative. Logic circuits 56–60 determine the range into which the absolute magnitude of the error signal $\Delta e$ falls. Particularly, logic circuit 56 determines if the absolute magnitude of the error signal $\Delta e$ is less than a first value V1, logic circuit 58 determines if the absolute magnitude of the error signal $\Delta e$ is less than a second value V2 and logic circuit 60 determines if the absolute magnitude of the error signal $\Delta e$ is less than a third value V3. To this end, logic circuit 56 generates a binary "0" whenever the absolute magnitude of error signal $\Delta e$ is less than the first value V1 and generates a logical "1" at all other times; logic circuit 52 generates a logical "0" whenever the absolute magnitude of error signal $\Delta e$ is less than the second value V2 and generates a logical "1" at all other times; and logic circuit 60 generates a logical "1" whenever the magnitude of error signal $\Delta e$ is less than the third value V3 and generates a logical "1" at all other times. Each of the logic circuits 56–60 include a pair of comparators 64, 66 and a pair of NAND gates 68, 70. The inverting input terminal of each of the comparators 64, 66 receives the error signal $\Delta e$. The non-inverting input terminals of comparators 64, 66 of logic circuit 56 receive a negative and positive biasing voltages $\pm V1$, respectively; the non-inverting input terminals of comparators 64, 66 of logic circuit 58 receive the negative and positive biasing voltages $\pm V2$, respectively; and the noninverting input terminals of comparators 64, 66 of logic circuit 60 receive the negative and positive biasing voltages $\pm V3$, respectively. So connected, the outputs of one of the comparators 64, 66 of logic circuits 56, 58 and 70 generate a binary "0" whenever the absolute magnitude of the error signal e is greater than the absolute magnitude of the voltages V1, V2 and V3, respectively. The outputs of each of the comparators 64 are applied to one input terminal of a respective NAND gate 68. The remaining input of each of the NAND gates 68 receives a positive biasing voltage $+V$ corresponding to a binary "1". The output of each of the NAND gates 68 is applied to one input of the NAND gate 70 in its respective logic circuit 56, 58 and 60. The remaining input of each NAND gate 70 receives the output of a respective comparator 66. So connected, NAND gates 70 of logic circuits 56, 58 and 60 generate binary "1"s at their outputs whenever the absolute magnitude of error signal $\Delta e$ is greater than biasing signals V1, V2 and V3, respectively. In this manner, logic circuits 54, 56, 58 and 60 generate a binary coded output signal (the classifier code) representative of the magnitude of error signal $\Delta e$.

The output of quantizier 48 is applied to the data inputs of a latch circuit 50. Latch circuit 50 also receives the clock and clear input signals generated by multiplexer (FIG. 1). The information on the data inputs of latch circuit 50 is latched at its output whenever a clock pulse is applied to the clock input thereof. The outputs of latch circuit 44 are cleared whenever a clear pulse is applied to its clear input. As will be shown below, multiplexer 38 applies clock and clear pulses to lines 34 and 36 respectively, in such a manner that the output of latch circuit 50 latches at each successive sampling instant corresponding to the each succeeding pixel of the input FSTV or SSTV signal clears (to a value corresponding to an all white pixel) at the beginning of each successive horizontal line of the incoming FSTV or SSTV signal.

The output of latch circuit 50 is preferably, but not necessarily, applied to an encoder 52 which reduces the x bit classifier code at the output of latch circuit 50 to a y bit decoder code, wherein $x > y$. By way of example, the four bit signal appearing at the output of latch circuit 50 may be reduced to a three bit digital signal in accordance with the following code:

TABLE 2

| CLASSIFIER CODE | | | | DECODER CODE | | |
|---|---|---|---|---|---|---|
| $a_0$ | $a_1$ | $a_2$ | $a_3$ | $b_0$ | $b_1$ | $b_2$ |
| 0 | 0 | 0 | 0 | 0 | 0 | 0 |
| 0 | 0 | 0 | 1 | 0 | 0 | 1 |
| 0 | 0 | 1 | 1 | 0 | 1 | 0 |
| 0 | 1 | 1 | 1 | 0 | 1 | 1 |
| 1 | 0 | 0 | 0 | 1 | 1 | 1 |
| 1 | 0 | 0 | 1 | 1 | 1 | 0 |
| 1 | 0 | 1 | 1 | 1 | 0 | 1 |
| 1 | 1 | 1 | 1 | 1 | 0 | 0 |

It should be apparent at this point that each successive bit signal appearing at the output of encoder 52 (and also at the output of latch circuit 50) is a DDC signal representative of the magnitude of the incoming SSTV or FSTV signal at each successive pixel position of that signal. Accordingly, each of the successively generated DDC signals may be stored to provide a complete video information for an entire frame of an SSTV or FSTV video signal. To this end, each of the successively generated DDC signals are applied to and stored in memory section 14. This process will be more fully described below.

In addition to be applied to memory section 14, the successive DDC signals generated by encoding section 40 are applied to feedback section 42. Feedback section 42 comprises a decoder/weigher 72, an adder 74, a storage register 76 and a digital to analog converter 78. Decoder/weigher 72 is responsive to the DDC signal on lines 22 and generates a digital output signal on line 96 which is representative of the predicted change in magnitude between the last generated predicted TV signal and the next generated predicted TV signal. More particularly, decoder/weigher 72 generates an output signal which is indicative of the weight given to each of the classifier codes as shown, by way of example, in Table 1. Generally speaking, the weights are chosen in such a way as to minimize the error between the actual video input signal and the predicted video signal. The particular weights chosen will differ depending on the kind of visual information which is being converted by scan converter 10. If material having only black and white tones (such as a letter) is being converted, there is no need for an extensive gray scale and it is desirable to correct errors in as quick a fashion as possible. In such a case, relatively large weighted values are used. If, on the other hand, information having several gray tones (such as a picture of a person's face) is being converted, it is desirable to have a gradual change from white to black. In this case, a more gradual connection of the error signal is desired and the value of the weights will be much smaller.

Adder circuit 74 receives a first input from decoder weigher 72 and a second input from storage register 76 and generates a digital output signal on line 80 which is representative of the sum of the two input signals. The output of adder 74 is applied to the data inputs of storage register 76 and digital to analog converter 78. In addition to the output of adder 74, storage register 76 also receives clock and clear pulses from multiplexer 38. As such, the signal on line 79 is clocked into storage register 76 at each successive sampling instant of the input FSTV or SSTV signal, and the information in storage register 76 is cleared (preferably to a value representing an all white pixel) at the beginning of each line of the input FSTV or SSTV signal. Accordingly, the output of adder 74 provides a digital representative of the predicated TV signal at the next sampling instant (the last predicted value plus or minus the correction indicated by the DDC signal generated by encoding circuit 40). The digital output of adder 74 is applied to digital analog converter 78 which generates an analog representative thereof on line 44. This analog signal is compared to the actual instantaneous input TV signal by difference amplifier 46 in the manner described above.

Figure 4:
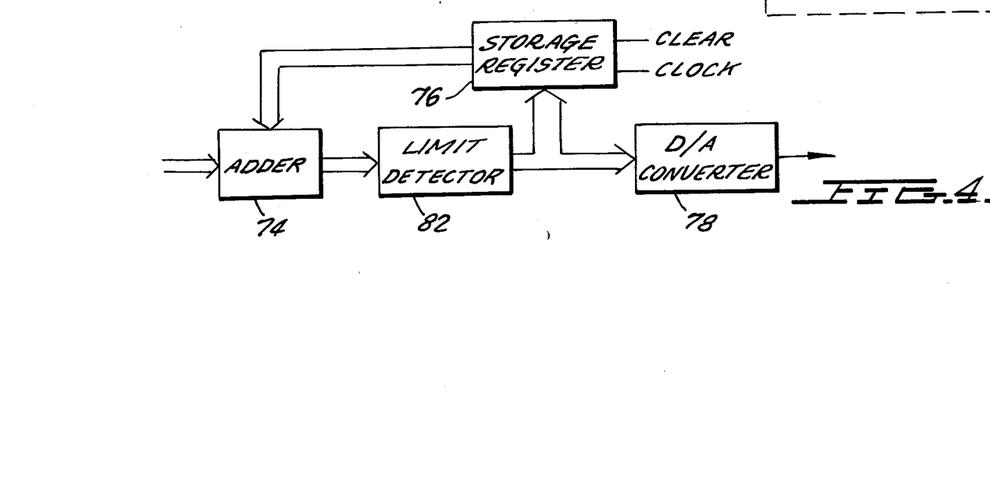
FIG. 4 is an alternative embodiment of the feedback section of the discrete differential coding circuit of FIG. 2.

In certain commercially available adder circuits, the adder will "roll over" from an all "1" output to an all "0" output whenever the sum of the two input signals equals a value greater than the maximum capacity of the adder. The reverse phenomenon will occur whenever the sum of the two input signals equals a value less than zero. This result will occur whenever encoding circuit 40 predicts a "blacker than black" or "whiter then white" video signal and is undesirable since it will cause the generation of a false black or false white pixel. Assuming 64 possible levels of brightness (0 representing all black and 63 representing all white—the intermediate numbers representing gray shades), a whiter than white prediction will occur whenever the last predicted signal and the correction indicated by encoding circuit 40 total more than 63. A blacker than black condition will occur whenever the last predicted signal and the correction indicated by encoding circuit 40 total less than zero. To avoid this problem, a limit detector may be interposed between the output of adder 74 and the inputs of digital to analog converter 78 and register 76. Such a modification is illustrated in FIG. 4. Limit detector 104 detects the roll over in the output of adder 74 (a change from all "0"s to all "1"s) and generates an output signal representative of either an all white or an all black pixel responsive thereto. More particularly, when adder 74 rolls over from an all white to a black signal, limit detector 82 generates an all white signal. When adder circuit 74 rolls over from an all black to a white signal, limit detector 82 generates an all black signal. Limit detector 82 is not required if adder 78 includes its own anti-roll over circuitry.

As indicated above, the clear and clock signals applied to discrete differential coding circuit 32 are supplied by multiplexer 38 (FIG. 1). Multiplexer 38 is a standard multiplexer which applies the information on its data inputs 84, 86 to lines 34, 36, respectively, whenever a binary "1" is applied to its control input 92 and applies the information appearing on its data inputs 88, 90 to lines 34, 36, respectively, whenever a binary "0" is applied to its control input 92. The control input 92 of multiplexer 38 is connected to the contact arm 30 of switch 26 and receives +V volts when scan converter 10 receives an input SSTV signal and 0 volts when scan converter 10 receives an input FSTV signal. So connection, multiplexer 38 applies the signals SSC and SHS to lines 34, 36, respectively, when scan converter 10 receives an input SSTV signal and applies the signals FSC and FHS to the lines 34, 36 respectively, when scan converter 10 receives an input FSTV signal.

Figure 5:
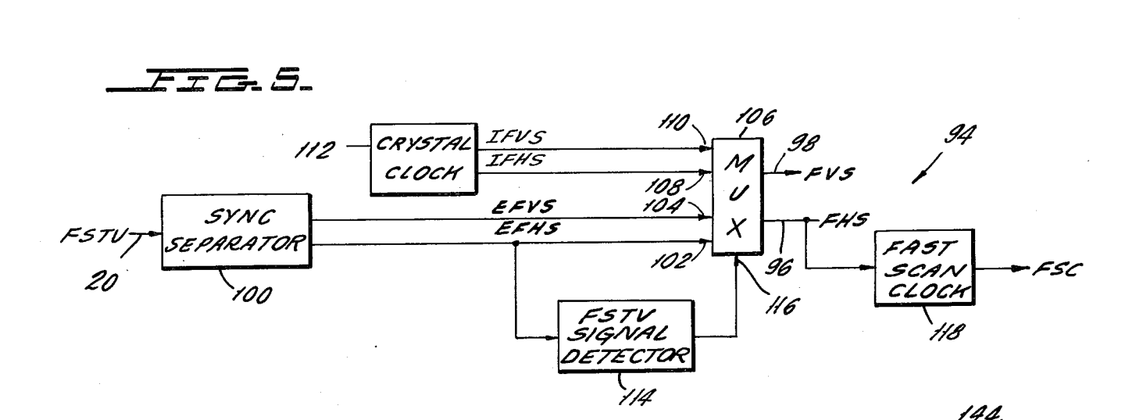
FIG. 5 is a block diagram of a fast scan timing circuit utilized in connection with the scan converter of FIG. 1.

The signals FSC and FHS are generated by timing circuit 94 which is illustrated in FIG. 5. Timing circuit 94 operates in two modes of operation. In the first mode of operation, timing circuit 94 removes the horizontal and vertical sync signals from an incoming FSTV signal on line 20 and applies them to lines 96, 98. In the second mode of operation, no FSTV signal appears on line 20 and timing circuit 94 internally generates internal fast horizontal and vertical sync signals and applies them to lines 96, 98, respectively.

When an FSTV signal appears on line 20, it is applied to sync separator 100 which removes the horizontal and vertical sync signals from the incoming FSTV signal in a known manner. These sync signals (EFHS and EFVS, respectively) are applied to the data inputs 102, 104 of multiplexer 106. The remaining data inputs 108, 110 of multiplexer 106 receive the internally generated fast horizontal and vertical sync signals IFHS, IFVS, respectively. The internally generated sync signals IFHS, IFVS are generated by a crystal clock 112 in a known manner.

The mode of operation of timing circuit 94 is controlled by FSTV signal detector 114. FSTV signal detector 114 determines whether or not an FSTV signal appears on line 20 and controls the operation of multiplexer 106 as a function of this determination. When signal detector 114 determines that an FSTV signal appears on line 20, it causes multiplexer 106 to apply the externally generated fast horizontal and vertical sync signals EFHS, EFVS applied to its data inputs 102, 104 to lines 96, 98, respectively. When signal detector 114 determines that an FSTV signal does not appear on line 20, it causes multiplexer 106 to apply the internally generated fast horizontal and vertical sync signals IFHS, IFVS applied to data inputs 108, 110 to lines 96, 98, respectively. In a preferred embodiment, signal detector 114 is a retriggerable one shot whose period is longer than the period of the successively generated fast horizontal sync pulses EFHS. As long as an FSTV signal appears on line 20, the output of the one shot will remain high (i.e. a binary "1". When an FSTV signal no longer appears on line 20, the one shot will time out and its output will go low (i.e. a binary "0"). By applying the output of the one shot to the control input 116 of multiplexer 106, the desired outputs will appear on lines 96, 98.

The fast horizontal sync signal FHS appearing on line 96 is applied to the input of fast scan clock generator 118. Fast scan clock generator 118 is preferably a crystal clock which generates a pulse train (the fast scan clock signal FSC) having a predetermined frequency equal to the frequency at which the incoming FSTV signal is to be sampled. As such, each successive pulse of the fast scan clock signal FSC corresponds to a different pixel of the fast scan television signal being written into or read out of memory section 14. The phase of the fast scan clock signal FSC is controlled by the fast horizontal sync signal FHS applied to the input of fast scan clock generator 118.

Figure 6:
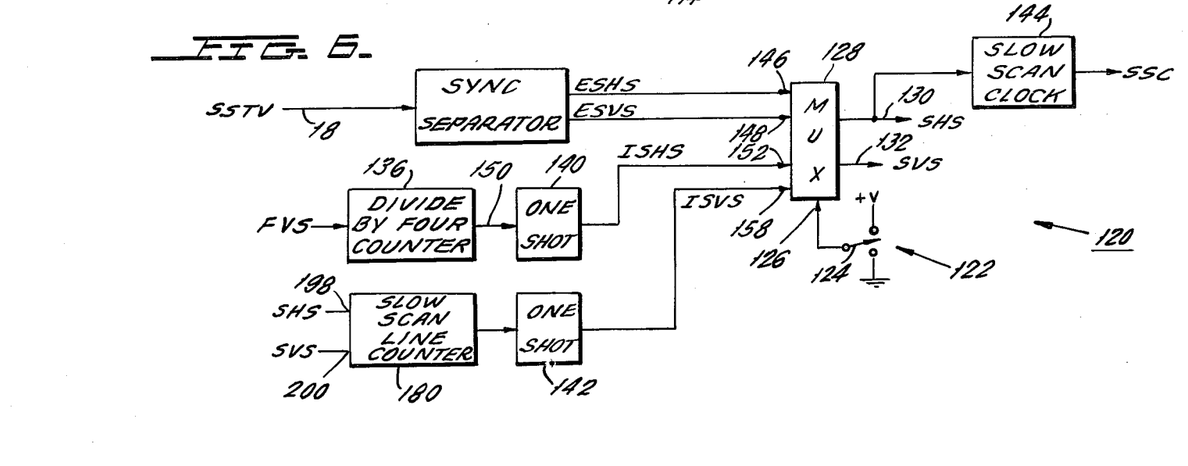
FIG. 6 is a block diagram of a slow scan timing circuit utilized in connection with the scan converter of FIG. 1.

The signals SHS and FHS are generated by a slow scan timing circuit 120 which is illustrated in FIG. 6. Slow scan timing circuit 120 operates in two modes of operation. In the first mode of operation, an SSTV signal appears on line 18 and the contact arm 124 of switch 122 (which is ganged to switches 24, 26) is in its upper position. In this position, timing circuit 120 removes the horizontal and vertical sync signals from the SSTV input signal on line 18 and places them on lines 130, 132, respectively. In the second mode of operation, no SSTV signal appears on line 18 and contact arm 124 is in its lower position. In this position, timing circuit 120 applies internally generated slow horizontal and vertical sync signals to lines 130, 132, respectively.

Slow scan timing circuit 120 includes a multiplexer 128, a sync separator 134, a divide by four counter 136, a slow scan counter 180, one shots 140, 142 and a slow scan clock generator 144. Sync separator 134 receives the SSTV signal on line 18 and removes the horizontal and vertical sync signals therefrom in a known manner. These signals are designated the externally generated slow horizontal and vertical sync signals ESHS and ESVS and are applied to data inputs 146, 148, respectively, of multiplexer 128.

Divide by four counter 136 receives the fast vertical sync signal FVS appearing on line 98 (FIG. 5) and generates an output signal on line 150 for every fourth pulse of the fast vertical sync signal (the standard ratio between the fast and slow vertical sync signals being four to one). This output signal is applied to one shot 140 which generates a single pulse of a predetermined duration in response thereto. This pulse defines the internally generated slow horizontal sync signal ISHS and is applied to data input 152 of multiplexer 128.

Slow scan line counter 180 receives the slow horizontal and vertical sync signals SHS and SVS on its clear and clock inputs 198, 200, respectively. As such, the instantaneous count in counter 180 increases by one for each successive pulse of the slow horizontal sync signal SHS and is cleared responsive to the generation of each successive pulse of the slow scan vertical signal SVS. The primary function of slow scan line counter 180 is to define the line address of the DDC signals read into or out of memory section 14 at the slow scan sampling rate. This function is discussed in further detail below. The function of slow scan line counter 180 in connection with slow scan timing circuit 120 is to determine when to generate the internally generated slow vertical sync signal ISVS. Line counter 180 performs this function by applying an enable signal to one shot 142 whenever the count in line counter 180 indicates that a full frame of slow scan video information has been written into or read out of memory section 14. This result is obtained by applying the most significant bit of the output lines of slow scan line counter 180 to the input of one shot 142. So connected, one shot 142 generates a single pulse of predetermined duration at its output when the slow scan line counter 180 reaches a value equal to the number of lines in a single frame of slow scan video information. The output of one shot 142 represents the internally generated slow vertical sync signal ISVS which is applied to data input 158 of multiplexer 128.

As noted above, the operation of slow scan timing circuit 120 is controlled by switch 122. When a slow scan TV signal appearing on line 18 is being read into memory section 14, the contact arm 124 of switch 128 is in its upper position and +V volts is applied to the control input 126 of multiplexer 128. So biased, multiplexer 128 applies the externally generated horizontal and vertical sync signals ESHS, ESVS to lines 130, 132, respectively. When FSTV video information is being read into memory section 14, the contact arm 124 of switch 122 is in its lower position and zero volts is applied to control input 126 of multiplexer 128. So biased, multiplexer 128 applies the internally generated slow horizontal and vertical sync signals ISHS, ISVS to lines 130, 132, respectively.

The slow horizontal sync signal SHS appearing on line 130 is applied to the input of slow scan clock generator 144. Slow scan clock generator 150 is preferably a crystal clock which generates a pulse train having a frequency equal to the frequency at which the incoming SSTV signal is to be sampled (and therefore equal to the pixel rate of the slow scan TV signal). This output signal represents the slow scan clock signal SSC. The phase of the slow scan clock signal SSC is controlled by the slow horizontal sync signal SHS applied to the input of slow scan clock generator 144.

Returning now to FIG. 1, multiplexer 38 applies the fast scan clock signal FSC and the externally generated fast horizontal sync signal EFHS to the clock and clear inputs 34, 36, respectively, of coding circuit 32 when input section 12 is converting FSTV information for storage in memory section 14. As such, the timing of discrete differential coding circuit 32 is properly synchronized to the timing of the input FSTV signal, each pulse of the fast scan clock signal FSC representing a succeeding pixel position in the FSTV signal and each fast horizontal sync signal FHS representing the initiation of a new line of FSTV video information. When input section 12 is converting SSTV information for storage in memory section 14, multiplexer 38 applies the slow scan clock signal SSC and externally generated slow horizontal sync signal ESHS to the clock and clear inputs 34, 36, respectively, of coding circuit 32 thereby also ensuring the proper timing of the coding circuit 32 during this mode of operation. Each pulse of the slow scan clock signal SSC represents the next pixel position of the input SSTV signal and each externally generated slow horizontal sync pulse ESHS represents the beginning of a next line of input video information. As a result, input section 12 converts the incoming SSTV or FSTV signal into a sequence of DDC coded binary signals each representative of a succeeding pixel position of the incoming video signal. These output signals are applied to memory section 14.

Memory section 14 comprises a digital memory 158 and a multiplexer 160. Digital memory 158 is a high speed digital memory which includes a data input 162, pixel and line address inputs 164, 166, respectively, and a read/write input 168. Information appearing at data input 162 is written into memory 158 whenever a write signal $\overline{W}$ is applied to read/write input 168. The particular location into which each of the successive DDC signals generated by input section 12 are written is determined by the address on the pixel and line address inputs 164, 166 at the instant at which each respective DDC is written into memory 158. The address signals applied to inputs 164 and 166 are generated by pixel address circuit 170.

Figure 7:
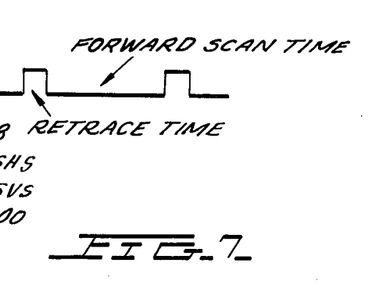
FIG. 7 is a block diagram of a pixel address circuit which generates the address signals applied to the memory of FIG. 1.

As shown in FIG. 7, pixel address circuit 170 includes a multiplexer 172, fast pixel and line counters 174, 176 and slow pixel and line counters 178, 180. Fast pixel counter 174 receives the fast scan clock and fast horizontal sync pulses FSC, FHS on its count and clear inputs 182, 184, respectively, and fast line counter 176 receives the fast horizontal and vertical sync signals FHS, FVS, on its clock and clear inputs 186, 188, respectively. So connected, the count is fast pixel counter 174 increases by one for each pulse of the fast scan clock signal FSC and is cleared responsive to the generation of each successive pulse of the fast horizontal sync signal FHS. Similarly, the instantaneous count in fast line counter 176 increases by one for each successive pulse of the fast horizontal scan signal FHS and is cleared responsive to the generation of each successive pulse of the fast vertical sync signal FVS. As a result, the instantaneous count in fast pixel and line counters 174, 176 represent the pixel and line location of each DDC successively written into or read out of memory 158 at the fast scan rate. The stored count in counters 174, 176 are applied to data inputs 190, 192, respectively, of multiplexer 172.

Slow pixel counter 178 receives the slow scan clock and slow horizontal sync signals SSC, SHS on its clock and clear inputs 194, 196, respectively, and slow line counter 180 receives the slow horizontal and vertical sync signals SHS, SVS on its clock and clear inputs 198, 200, respectively. So connected, the count in slow pixel counter 178 increases by one for each successive pulse of the slow scan clock signal SSC and is cleared responsive to the generation of each successive pulse of the slow horizontal scan signal SHS. Similarly, the instantaneous count in slow line counter 180 increases by one for each successive pulse of the slow horizontal sync signal SHS and is cleared responsive to the generation of each successive pulse of the slow vertical sync signal SVS. As a result, the instantaneous count in slow pixel and line counters 178, 180 represent the pixel and line location of each DDC signal successively written into or read out of memory 172 at the slow scan rate. The count in slow pixel and line counters 178, 180 are supplied to data inputs 202, 204, respectively, of multiplexer 172.

As noted above, the instantaneous count in fast pixel and line counters 174, 176 determine the storage location in memory 158 into which each pixel of the fast scan video information is either written into or read out of digital memory 158. The instantaneous count in slow pixel and line counters 178, 180 determines the storage location into which each pixel of the slow scan video information is either written into or read out of digital memory 158. These two pair of addresses are alternately applied to digital memory 158 by multiplexer 172 in such a manner that fast scan information is either written into or read out of digital memory 158 during the forward scan time of the fast scan video signal only and slow scan vide information is either written into or read out of memory 158 during the retrace time of the fast scan information only. These two time periods are defined by the fast horizontal sync signal FHS. Assuming positive logic as illustrated in FIG. 7, each positive going pulse of the fast scan horizontal sync signal FHS defines the retrace time of the fast scan video signal and the remaining portion of the fast scan horizontal signal defines the forward scan time of the fast video signal. The foregoing addressing sequence is obtained by applying the fast scan horizontal sync signal FHS to the control input 206 of multiplexer 172. So connected, multiplexer 172 applies the output of fast pixel and line counters 174, 176 to the pixel and line inputs 164, 166, respectively, of digital memory 158 whenever the fast horizontal scan signal is low (i.e., during the forward scan time of the fast scan video signal) and applies the output of the slow pixel and line counters 178, 180 to the pixel and line address inputs 164, 166, respectively, of digital memory 158 whenever the fast horizontal sync signal FHS is high (during the retrace time of the fast scan video signal).

Figure 8:
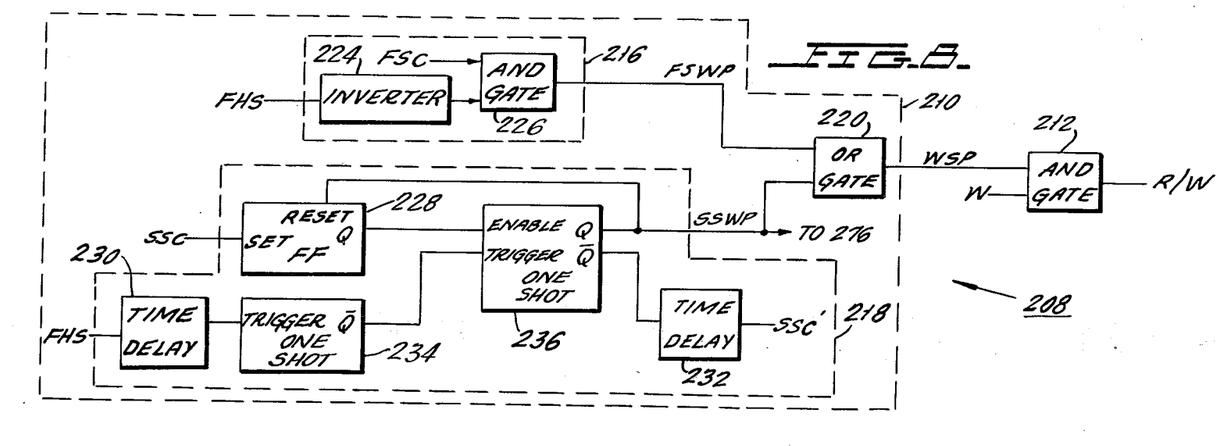
FIG. 8 is a block diagram of the read/write timing circuit which generates the read/write signal applied to the digital memory of FIG. 1.

Referring again to FIG. 1, memory section 14 is operable in a read and a write mode of operation. During the write mode of operation, the DDC signals generated by input section 12 are written into the storage locations of memory 158 identified by the pixel and line addresses applied to address inputs 164, 166 of memory 158. During the read mode of operation, the DDC signals stored in the locations identified by the pixel and line addresses applied to inputs 164, 166 are read out of digital memory 158 and applied to output section 16. Control over the read and write modes of operation is provided by the read/write signal R/W applied to read/write input 168 of memory 158. The read/write signal is generated by read/write timing circuit 208 which is illustrated in FIG. 8.

Read/write timing circuit 208 includes a write signal pulse generator 210 and an AND-gate 212. Write signal pulse generator 210 generates a write signal pulse train WSP which define the instants at which successive DDC signals generated by input section 12 are written into memory 158. The write signal pulse train WSP gated by AND-gate 212 and is applied to the read/write input 160 of digital memory 158 whenever a write enable signal W is applied to the second input of AND-gate 212. The write enable signal W may be manually or automatically generated whenever new video information is to be read into digital memory 158. By way of example, the write enable signal W may be generated by closing a normally open push-button switch which applies a positive biasing voltage (assuming positive logic) to AND-gate 212. Normally, write enable signal W is not generated and AND-gate 212 does not gate the write signal pulse train WSP. In this condition, memory section 14 is placed in the read mode of operation and the stored video information in digital memory 158 is continually applied to line 214. Particularly, the DDC signals stored in memory 158 are read out of memory 158 at both the slow scan and fast scan rates in a time multiplexed manner.

Write signal pulse generator 210 includes a fast scan write signal generator 216, a slow scan write signal generator 218 and an OR-gate 220. Fast scan write signal generator 210 comprises an inverter 224 and an AND-gate 226 and generates a fast scan write pulse train FSWP which defines the instants at which successive DDC signals generated by input section 12 and representative of FSTV video information is read into digital memory 158. Fast scan write signal generator 218 generates the fast scan write pulse train FSWP in such a manner that the fast scan video information is read into memory 158 only during the forward scan time of the fast scan video signal. To this end, the fast horizontal sync signal FHS is inverted by inverter 224 and applied to one input of AND-gate 226. The remaining input of AND-gate 226 receives the fast scan clock signal FSC. So connected, AND-gate 226 passes the fast scan clock signal FSC only during the forward scan time interval of the fast scan video signal.

Slow scan write signal generator 218 comprises a flip/flop 228, a pair of time delay circuits 230, 232 and a pair of one shots 234, 236 and generates a slow scan write pulse train SSWP which defines the instants at which successive DDC signals generated by input section 12 and representative of SSTV video information are read into memory 158. Slow scan write signal generator 218 generates the slow scan write pulse train SSWP in such a manner that the slow scan video information is read into memory 158 only during the retrace time of the fast scan video signal and only when a new DDC signal is available at the output of input section 12. As will become apparent below, flip/flop 228 ensures that slow scan DDC signals are written into memory 158 only during the retrace time interval of the fast scan video signal and one shot 234 ensures that slow scan DDC video information is read into memory 158 only after a new DDC signal is generated by input section 12.

Slow scan write signal generator 218 receives the slow scan clock and fast horizontal sync signals SSC and FHS. The slow scan clock and fast horizontal sync signals SSC and FHS are applied to the set input of flip/flop 228 and to the input of time delay circuit 230, respectively. The Q output of flip/flop 228 goes high each time a new slow scan clock signal SSC is applied to its set input. As a result, the positive transition of the Q output of flip/flop 228 provides an indication that a new slow scan DDC signal has been generated by input section 12. One shot 234 generates a positive going pulse of predetermined duration whenever the fast horizontal sync signal FHS pulse is high. More particularly, one shot 234 generates a positive going pulse a predetermined time interval after the generation of each successive pulse of the fast horizontal sync signal FHS, which time delay is determined by time delay circuit 230 (e.g., an RC circuit). As a result, the pulse appearing at the output of one shot 234 indicates the presence of the retrace time interval of the fast scan video signal. The time delay interposed by time delay circuit 230 is provided to ensure that information is written into memory 158 only after the address inputs 164, 166 have had an opportunity to settle.

The outputs of flip/flop 228 and one shot 234 are applied to the enable and trigger inputs, respectively, of one shot 236. So connected one shot 236 acts as a gating circuit and generates a positive going pulse of a predetermined duration only during the retrace time of the fast scan video signal and after a new slow scan DDC signal has been generated by input section 12. The output pulse generated by one shot 236 is applied to the reset input of flip/flop 228, resetting its Q output. The Q output of flip/flop will remain low until the next pulse of the slow scan clock signal SSC is applied to the said input thereof.

The output of one shot 236 represents the slow scan write pulse train SSWP generated by slow scan write signal generator 218 and it is applied to one input of OR-gate 210. OR-gate 220 passes both the slow and fast scan write pulse trains SSWP, FSWP and applies it to single input of AND-gate 212 as described above.

Finally, the output pulse is generated by one shot 236 or applied to the second time delay circuit 232. The output of time delay circuit 232 defines a delayed slow scan clock signal SSC' which may be applied to the count input 194 of slow pixel counter 178 (FIG. 7) instead of the slow scan signal SSC generated by slow scan clock generator 144. The delay imposed by time delay circuit 22 ensures that the address signal generated by slow scan pixel counter 178 will remain constant until the right operation has been completed.

The read/write signal R/$\overline{W}$ applied to input 160 of digital memory 158 is also applied to the control input 138 of multiplexer 160. Whenever information is not being written into memory 158 (when the write signal W is not generated), multiplexer 160 applies the output of digital memory 158 to output circuit 16. In this mode, the DDC signal stored in memory 168 are read out of the memory at both the fast scan and slow scan rates in a time multiplex fashion. Particularly, the information stored in memory 158 are read out of the memory at fast scan rate during the forward scan time of the fast scan video signal and the information stored in memory 158 are read out of the memory at the slow scan rate during the horizontal retrace time of the fast scan video signal. During the read mode of operation of memory section 14, the fast scan and slow scan information is constantly applied to output circuit 16 in the foregoing time multiplexed manner.

During the write mode of operation of memory section 14, the outputs of digital memory 158 obtain a high resistance state and the slow and fast scan pixel information (in the form of DDC signals) is not available on line 214. To ensure that fast scan video information will be available to output circuit 16 during the write mode of operation (in order that the FSTV video output may be viewed on an appropriate manner when information is read into memory 158), the multiplexer 160 bypasses the digital memory 158 and directly applies the DCC signals generated by input section 12 to output section 16.

Output section 16 comprises a fast scan decoding circuit 240 and a slow scan decoding circuit 242. Fast scan decoding circuit 240 samples the DDC signals appearing at the output of multiplexer 160 at the fast scan rate and generates an FSTV video output signal representative thereof. Slow scan decoding circuit 242 samples the DDC signals appearing at the output of multiplexer 160 at the slow scan rate and generates an FM modulated SSTV output signal representative thereof. Since the slow scan and fast scan DDC signals appearing at the output of multiplexer 160 are time multiplexed, fast and slow scan decoding circuits 240, 242 must sample the DDC signals appearing at the output of multiplexer 160 during separate time intervals. Particularly, fast scan decoding circuit 240 samples the DDC signals appearing at the output of multiplexer 160 during the forward scan time of the fast scan video signal and slow scan decoding circuit 242 samples the DDC signals appearing at the output of multiplexer 160 during the horizontal retrace time of the fast scan video signal.

Fast scan decoding circuit 240 comprises a latch circuit 244, a discrete differential decoding circuit 246 and a video amplifier 248. Latch circuit 244 receives the DDC signals appearing at the output of multiplexer 160 on its data input 250 and receives the fast scan clock and fast horizontal sync signals FSC, FHS on its clock and clear inputs 252, 254, respectively. So connected, latch circuit 244 latches the DDC signal appearing on its data input 250 for each pulse of the fast scan clock input FSC. Latch 244 clears responsive to the generation of each successive pulse of the fast scan horizontal sync signal FHS.

Figure 9:
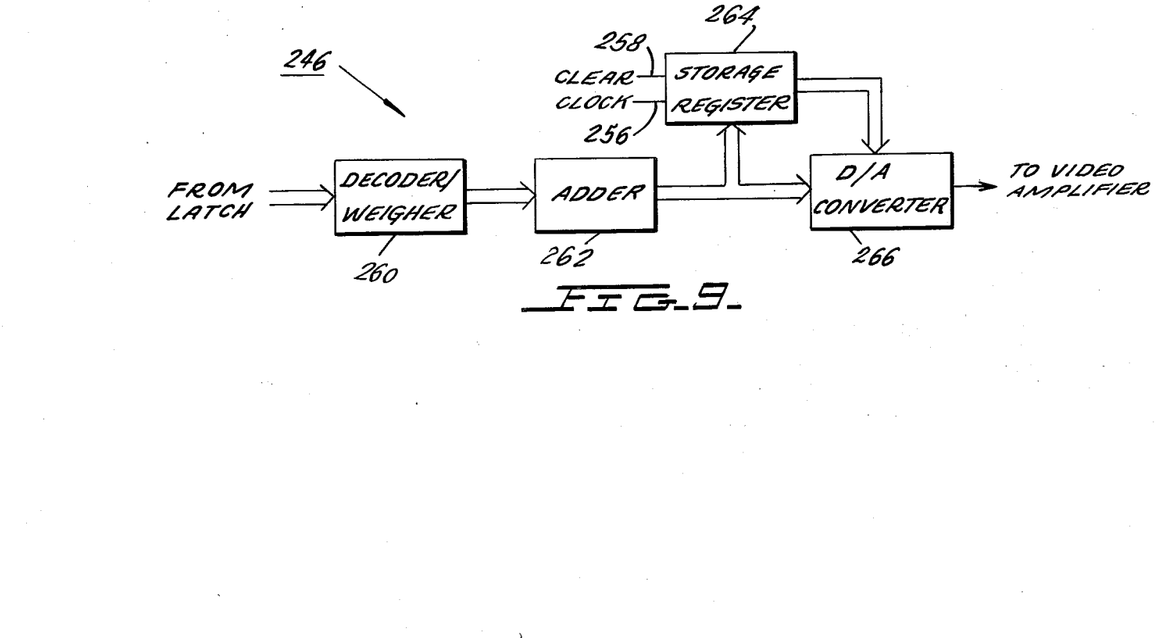
FIG. 9 is a block diagram of the discrete differential decoding circuits of FIG. 1.

The output of latch circuit 244 is applied to the data input of discrete differential coding circuit 246 which also receives the fast scan clock and fast scan hoirzontal sync signals FSC, FHS on its clock and clear inputs 256, 258, respectively. The structure of discrete differential coding circuit 246 is illustrated in FIG. 9. As shown therein, discrete differential decoding circuit 246 comprises a decoder/weigher 260, an adder 262, a storage register 264 and a digital to analog converter 266. The structure and operation of discrete differential decoding circuit 246 is identical to that of feedback section 42 of discrete differential coding circuit 32 (see FIG. 2). Accordingly, the analog signal appearing at the output of digital to analog converter 266 provides a true representation of the original input FSTV signal stored in digital memory 158. The output of decoding circuit 246 is applied to the input of video amplifier 248 which both amplifies the signal and adds internally generated fast horizontal and vertical sync signals IFHS, IFVS thereto. The output of video amplifier 248 may then be applied to a standard FSTV monitor which will provide a frozen picture of the TV signal stored in memory 158.

Slow scan decoding circuit 242 comprises a latch circuit 268, a discrete differential decoding circuit 270 and a video to FM converter 272. Latch circuit 268 receives the DDC signals appearing at the output of multiplexer 170 on its data input 274. The slow scan write pulse and internally generated slow horizontal sync pulses SSWP, ISHS are applied to the clock and clear inputs 276, 278, respectively, of latch circuit 268. So connected, the latch circuit 268 will latch each of the DDC signals appearing at the output of multiplexer 160 during the retrace time interval of the fast scan video signal. It should be noted that this time that the slow scan write pulse signal SSWP is utilized to clock latch circuit 268 rather than the slow scan clock signal SSC for the same reasons that the slow scan write pulse signal SSWP is utilized in connection with the read/write signal applied to input 168 of digital memory 158.

The output of latch circuit 268 is applied to discrete differential decoding circuit 270 which receives the slow scan clock and slow scan horizontal sync signals on its clock and clear inputs 280, 282, respectively. Discrete differential decoding circuit 270 is identical in structure and operation to discrete differential decoding circuit 246. Accordingly, decoding circuit 270 generates an anlog signal at its output which is a reproduction of the single video frame stored in memory 158. The output of decoding circuit 270 is applied to video to FM converter 272 which amplifies the reproduced signal, adds the internally generated horizontal and vertical sync signals ISHS, ISVS thereto and FM modulates the combined signal to generate an FM SSTV output. This output may then be transmitted over a narrow bandwidth transmission network such as the Bell Telephone network.

The present invention may be embodied in other specific forms without departing from the spirit or essential attributes thereof and, accordingly, reference should be made to the appended claims, rather than to the foregoing specification as indicating the scope of the invention.

What is claimed is:

1. A scan rate converter, comprising:

(A) input section means operable in both a fast scan conversion and a slow scan conversion mode, said input section means for:
  (1) sampling an input FSTV signal at a fast scan rate when said input section means is operated in said fast scan conversion mode, said input FSTV signal including a plurality of lines of video information;
  (2) sampling an input SSTV signal at a slow scan rate when said input section means is operated in said slow scan conversion mode, said input SSTV signal including a plurality of lines of video information; and
  (3) generating a discrete differential coded signal responsive to each said sampling of said input FSTV and input SSTV signals when said input section means is operated in said fast scan and slow scan modes of operation, respectively, such that each line of video information being sampled is divided into a plurality of discrete differential coded signals, each of said discrete differential coded signals having a magnitude determined by the difference between the actual magnitude of the FSTV or SSTV signal being sampled at the sampling instant corresponding to the discrete differential coded signal in question and a predicted magnitude of the FSTV or SSTV signal being sampled at the sampling instant corresponding to the discrete differential coded signal in question, the value of said predicted magnitude of the FSTV or SSTV signal being sampled being reset to a predetermined value at each sampling instant corresponding to the first discrete differential coded signal in a line of video information being sampled, (B) memory section means operable in a read and a write mode of operation, said memory section means for:
  (1) storing each of said discrete differential coded signals generated by said input section means when said memory section means is operated in said write mode; and
  (2) reading said discrete differential coded signals stored in said memory section means out of said memory section means when said memory section means is operated in said read mode, said discrete differential coded signals stored in said memory section means being read out of said memory section means at both said fast scan and said slow scan sampling rates in a time multiplexed manner; and (C) output section means for:
  (1) converting said discrete differential coded signals read out of said memory section means at said fast scan rate into an output FSTV signal; and
  (2) converting said discrete differential coded signals read out of said memory section means at said slow scan rate into an output SSTV signal.

2. The scan rate converter of claim 1 wherein said input section means comprises:

(A) a discrete differential coding circuit operable in a fast scan and a slow scan conversion mode, said discrete differential coding circuit:
  (1) sampling the magnitude of said input FSTV signal at each of a plurality of fast scan sampling instants when said discrete differential coding circuit is operated in said fast scan conversion mode, the frequency of said fast scan sampling instants being equal to said fast scan sampling rate; and (2) sampling the magnitude of said input SSTV signal at each of a plurality of slow scan sampling instants when said discrete differential coding circuit is operated in said slow scan conversion mode, the frequency of said slow scan sampling instants being equal to said slow scan sampling rate; and (B) control means for selectively operating said discrete differential coding circuit in said fast scan or said slow scan conversion modes.

3. The scan rate converter of claim 2 wherein said discrete differential coding circuit comprises:

(A) feedback section means for:
 (1) generating a predicted FSTV signal representative of the predicted magnitude of said input FSTV signal at each successive fast scan sampling instant when said discrete differential coding circuit is operated in said fast scan conversion mode, said predicted FSTV signal corresponding to said predicted magnitude when said converter is operated in said fast scan conversion mode; and
 (2) generating a predicted SSTV signal representative of the predicted magnitude of said input SSTV signal at each successive slow scan sampling instant when said discrete differential coding circuit is operated in said slow scan conversion mode, said predicted SSTV signal corresponding to said predicted magnitude when said converter is operated in said slow scan conversion mode; and (B) encoding section means for:
 (1) generating a succession of discrete differential coded signals, each of said discrete differential coded signals being representative of the difference between the magnitude of said predicted FSTV signal and said input FSTV signal at respective ones of said fast scan sampling instants when said discrete differential coding circuit is operated in said fast scan conversion mode; and
 (2) generating a sequence of discrete differential coded signals, each of said discrete differential coded signals being representative of the difference between the magnitude of said predicted SSTV signal and said input SSTV signal at a respective one of said slow scan sampling instants when said discrete differential coding circuit is operated in said slow scan conversion mode.

4. The scan rate converter of claim 3, wherein said feedback section means generates each said predicted FSTV and SSTV signal as a function of the last generated discrete differential coded signal when said discrete differential coding circuit is operated in said fast scan and slow scan conversion modes, respectively.

5. The scan rate converter of claims 3 or 4, wherein said encoding section means comprises:
 (A) difference amplifier means for generating an analog difference signal representative of the instantaneous difference in the magnitude of said input SSTV and FSTV signals and the magnitude of said predicted FSTV and SSTV signals when said discrete differential coding circuit is operated in said fast scan and slow conversion modes, respectively; and (B) digital quantizer means responsive to said analog difference signal for classifying the magnitude of said difference signal into one of a plurality of error categories and for generating a digital output signal representative of said classification, said digital output signal defining said discrete differential coded signal.

6. The scan rate converter of claim 5, wherein said encoding section means further comprises a latch circuit for latching said output signal generated said quantizer means at each of said fast scan sampling instants when said discrete differential coding circuit is operated in said fast scan conversion mode and for latching said output signal generated by said quantizer means at each of said slow scan sampling instants when said discrete differential coding circuit is operated in said slow scan conversion mode.

7. The scan rate converter of claim 6, wherein said encoding section means further comprises an encoder for encoding the output of said latch circuit in such a manner as to reduce the number of bits in said discrete differential coded signal.

8. The scan rate converter of claim 4, wherein said feedback section comprises:
 (A) decoder/weigher means responsive to said discrete differential coded signals for generating an output signal representative of the predicted change in magnitude between the last generated predicted FSTV and SSTV signals and the next generated predicted FSTV and SSTV signals when said discrete differential encoding circuit is operated in said fast scan and slow scan conversion modes, respectively;
 (B) storage register means for storing the magnitude of the last generated predicted FSTV and SSTV signals when said discrete differential coding circuit is operated in said fast scan and slow scan modes, respectively; and
 (C) adder means for adding said signal stored in said storage register means and said signal generated by said decoder/weigher means and for generating an output signal representative of the predicted FSTV and SSTV signals at the next fast scan and slow scan sampling instants when said discrete differential coding circuit is operated in said fast scan and slow scan conversion modes, respectively.

9. The scan rate converter of claim 8, wherein said decoder/weigher means, said storage register means, and said adder means are digital circuit elements and said output signal generated by said adder means is applied to a digital to analog converter means which generates said analog predicted FSTV and SSTV signals when said discrete differential coding circuit is operated in said fast scan and slow scan conversion modes, respectively.

10. The scan rate converter of claim 1 wherein said memory section means comprises:
 digital memory means for storing discrete differential coded signals applied to its data input in storage locations identified by pixel and line addresses applied to its pixel and line address inputs whenever write pulses are applied to its read/write input; and
 address generating circuit means for generating fast pixel and line address signals and slow pixel line address signals in a time multiplexed manner, said fast and slow pixel and line address signals being applied to said pixel and line address inputs of said digital memory means; and read/write timing circuit means for applying fast scan write pulses to said read/write input of said digital memory means when said fast pixel and line address signals are applied to said pixel and line address inputs of said digital memory means and for applying slow scan write pulses to said rewrite input of said digital memory means when said fast pixel and line addresses are applied to said pixel and line addresses of said digital memory means;

said digital memory means reading said discrete differential coded signals stored in said digital memory means being read out of said memory means when neither said fast scan or said slow scan write pulses are applied to said read/write input of said memory means, said discrete differential coded signals stored in said digital memory means being read out of said memory means at both said fast scan and said slow scan sampling rates in a time multiplex manner.

11. The scan rate converter of claim 10 wherein said memory section means further includes multiplexer means for applying said discrete differential coded signals to said output section means when said discrete differential coded signals are read out of said digital memory means and for applying said discrete differential signals generated by said input section means to said output section means when said discrete differential coded signals are being read into said digital memory means.

12. The scan rate converter of claim 1 wherein said output section means comprises:
fast scan output circuit means for converting the discrete differential coded signals read out of said memory section means at said fast scan sampling rate into an FSTV video output signal; and
slow scan output means responsive to said discrete differential coded signals read out of said memory section means at said fast scan sampling rate for generating an FM SSTV output signal.

13. The scan rate converter of claims 3 or 4, wherein said feedback section means includes means for resetting said predicted FSTV and SSTV signals to a predetermined value at the beginning of each line of video information being sampled when said converter is operated in said FSTV and SSTV scan conversion modes, respectively.

14. A scan rate converter, comprising:
(A) input section means operable in both a fast scan conversion and a slow scan conversion mode, said input section means for:
(1) sampling an input FSTV signal at a fast scan rate when said input section means is operated in said fast scan conversion mode;
(2) sampling an input SSTV signal at a slow scan rate when said input section means is operated in said slow scan conversion mode; and
(3) generating a discrete differential coded signal responsive to each said sampling of said input FSTV and input SSTV signals when said input section means is operated in said fast scan and slow scan modes of operation, respectively;
(B) memory section means operable in a read and a write mode of operation, said memory section means for:
(1) storing each of said discrete differential coded signals generated by said input section means when said memory section means is operated in said write mode; and
(2) reading said discrete differential coded signals stored in said memory section means out of said memory section means when said memory section means is operated in said read mode, said discrete differential coded signals stored in said memory section means being read out of said memory section means at both said fast scan and said slow scan sampling rates in a time multiplexed manner; and
(C) output section means for:
(1) converting said discrete differential coded signals read out of said memory section means at said fast scan rate into an output FSTV signal; and
(2) converting said discrete differential coded signals read out of said memory section means at said slow scan rate into an output SSTV signal;
(D) said input section means comprising:
(1) a discrete differential coding circuit operable in a fast scan and a slow scan conversion mode, said discrete differential coding circuit:
(a) sampling the magnitude of said input FSTV signal at each of a plurality of fast scan sampling instants when said discrete differential coding circuit is operated in said fast scan conversion mode, the frequency of said fast scan sampling instant being equal to said fast scan sampling rate; and
(b) sampling the magnitude of said input SSTV signal at each of a plurality of slow scan sampling instants when said discrete differential coding circuit is operated in said flow scan conversion mode, the frequency of said slow scan sampling instants being equal to said slow scan sampling rate; and
(2) control means for selectively operating said discrete differential coding circuit and said fast scan or said slow scan conversion modes as selected;
(E) said discrete differential coding circuit comprising:
(1) feedback section means for:
(a) generating a predicted FSTV signal representative of the predicted magnitude of said input FSTV signal at each successive fast scan sampling instant when said discrete differential coding circuit is operated in said fast scan conversion mode; and
(b) generating a predicted SSTV signal representative of the predicted magnitude of said input SSTV signal at each successive slow scan sampling instant when said discrete differential coding circuit is operated in said slow scan conversion mode; and
(2) encoding section means for:
(a) generating a succession of discrete differential coded signals, each of said discrete differential coded signals being representative of the difference between the magnitude of said predicted FSTV signal and said input FSTV signal at respective ones of said fast scan sampling instants when said discrete differential coding circuit is operated in said fast scan conversion mode; and
(b) generating a sequence of discrete differential coded signals, each of said discrete differential coded signals being representative of the difference between the magnitude of said predicted SSTV signal and said input SSTV signal at a respective one of said flow scan sampling instants when said discrete differential coding circuit is operated in said flow scan mode;

(F) said feedback section means generating each said predicted FSTV and SSTV signal as a function of the last generated discrete differential coding circuit when operated at said fast scan and slow scan conversion modes, respectively; and (G) said feedback section means comprising:
(1) decoder/weigher means responsive to said discrete differential coded signals for generating an output signal representative of the predicted change in magnitude between the last generated predicted FSTV and SSTV signals and the next generated predicted FSTV and SSTV signals when said discrete differential coding circuit is operated in said fast scan and slow scan conversion modes, respectively;

(2) storage register means for storing the magnitude of the last generated predicted FSTV and SSTV signals when said discrete differential coding circuit is operated in said fast scan and slow scan modes, respectively; and (3) adder means for adding said signal stored in said storage register means and said signal generated by said decoder/weigher means and for generating an output signal representative of the predicted FSTV and SSTV signals at the next fast scan and slow scan sampling instants when said discrete differential coding circuit is operated in said fast scan and slow scan conversion modes, respectively.

* * * * *